United States Patent
Lohmeyer et al.

(10) Patent No.: US 11,755,312 B2
(45) Date of Patent: Sep. 12, 2023

(54) BOOTLOADER UPDATE

(71) Applicant: GM Cruise Holdings LLC, San Francisco, CA (US)

(72) Inventors: James Bradley Lohmeyer, Berkeley, CA (US); Charles Z. Mooney, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/480,035

(22) Filed: Sep. 20, 2021

(65) Prior Publication Data

US 2023/0229425 A1     Jul. 20, 2023

(51) Int. Cl.
    *G06F 9/44*     (2018.01)
    *G06F 8/654*     (2018.01)
    *G06F 9/4401*     (2018.01)

(52) U.S. Cl.
    CPC ............ *G06F 8/654* (2018.02); *G06F 9/4401* (2013.01)

(58) Field of Classification Search
None
See application file for complete search history.

(56) References Cited

U.S. PATENT DOCUMENTS

| | | | | |
|---|---|---|---|---|
| 8,612,734 | B2 * | 12/2013 | Tazzari | G06F 8/654 |
| | | | | 717/176 |
| 8,825,991 | B2 * | 9/2014 | Kim | G06F 8/654 |
| | | | | 717/168 |
| 11,137,995 | B2 * | 10/2021 | Doering | G06F 8/654 |
| 2019/0087173 | A1 * | 3/2019 | Lappi | G06F 8/654 |
| 2022/0171614 | A1 * | 6/2022 | Wolnowski | G06F 8/654 |

* cited by examiner

*Primary Examiner* — Qamrun Nahar
(74) *Attorney, Agent, or Firm* — Novak Druce Carroll LLP

(57) ABSTRACT

The subject disclosure relates to techniques for updating a bootloader on a embedded device. In some aspects, a process of the disclosed technology can include steps for calculating a digest for an existing bootloader stored on the bootloader memory, determining if the digest for the existing bootloader matches a digest for a target bootloader, and copying the target bootloader to the bootloader memory, if the digest for the existing bootloader does not match the digest for the target bootloader. Systems and computer-readable media are also provided.

20 Claims, 7 Drawing Sheets

BOOTLOADER UPDATE

BACKGROUND

1. Technical Field

The subject technology provides techniques for updating a bootloader and in particular, for updating a bootloader on an embedded device using binary packages embedded in application data.

2. Introduction

An embedded system refers to an apparatus including one or more interconnected controller chips on a printed circuit board. A controller chip can have one or more central processing units (CPUs) that enables it to interpret and execute code.

Some systems contain nonvolatile memory which is used to store firmware and/or application instructions that can be read and executed by a CPU, for example, to initialize the system. Depending on the implementation, the nonvolatile memory can be a read-only memory (ROM), one-time programmable memory (OTP), programmable read only memory (PROM), electrically erasable PROM (EEPROM), a flash PROM (FPROM), or the like. In some instances, the nonvolatile memory can be internal (on-chip) or external (off-chip) in relation to the controller. The firmware stored in the nonvolatile memory can be a boot loader, a basic input/output system (BIOS), an operating system (OS), and/or application firmware, and the like.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description that includes specific details for the purpose of providing a more thorough understanding of the disclosed technology. However, it will be clear and apparent that the subject technology is not limited to the specific details set forth herein and may be practiced without these details. In some instances, structures and components are shown in block diagram form to avoid obscuring the concepts of the subject technology.

As described herein, some aspects of the present technology include the gathering and use of data available from various sources to improve quality and experience. The present disclosure contemplates that in some instances, this gathered data may include personal information. The present disclosure contemplates that the entities involved with such personal information respect and value privacy policies and practices.

Embedded systems, such as in-vehicle computers, contain bootloader firmware that performs functions for loading and booting operating systems (OS) and other software modules. In some implementations, such as for autonomous vehicle (AV) applications, some physical ports of the embedded system, such as the Joint Test Action Group (JTAG) interface/port, or Serial Wire Debut (SWD) port, may be secured to prevent access to the bootloader portions of embedded system memory. By way of example, JTAG interfaces may be secured by being physically blocked or obstructed, e.g., with solder or epoxy, in order to prevent off-system interference. In such instances, it can be difficult to perform necessary bootloader updates without the need for removing hardware from the AV.

Aspects of the disclosed technology address the foregoing limitations of some embedded system deployments by providing techniques for updating bootloader modules without the need for physically interfacing with a JTAG port. In some approaches, a technique of the disclosed technology uses an update application that includes one or more data structures that store binaries of an updated (target) bootloader. By writing the application, including the contained data structures, to a memory of the embedded system, the update application can then perform steps necessary to update a legacy bootloader. In some aspects, the update application and bootloader can be stored to the same physical memory device, i.e., a non-volatile memory. When performing the update, the update application can copy binaries for the target bootloader (e.g., from data structures stored within the update application code), to the bootloader portion of memory.

Figure 1:
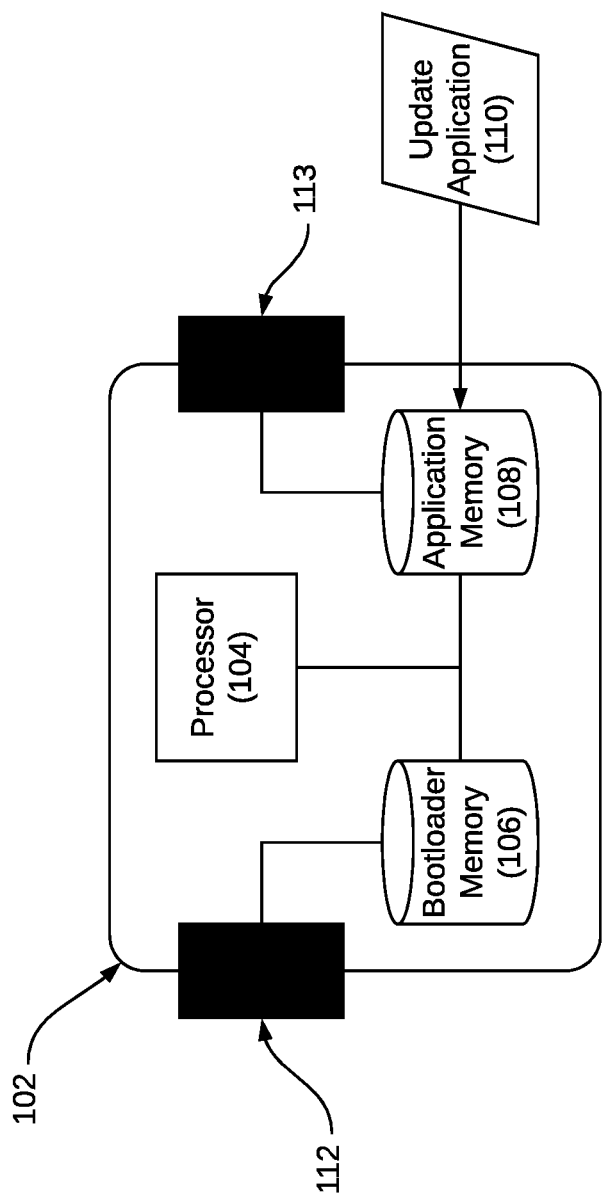
FIG. 1 illustrates a conceptual block diagram of an embedded system on which a bootloader update process may be implemented, according to some aspects of the disclosed technology.

FIG. 1 illustrates a conceptual block diagram of an embedded system 102 on which a bootloader update process may be implemented. Embedded system 102 includes at least one processor 104, and one or more memories, e.g., a bootloader memory portion 106, and an application memory portion 108, that are coupled to processor 104. In some implementations, system 102 may include one or more data ports 112, 113, that can be configured to facilitate data transfers from external devices, to one or more portions of memory (106, 108) on the embedded device 102. Depending on the device configuration, the physical ports may include a variety of port types, including but not limited to one or more: JTAG, Serial Wire Debut (SWD) ports, Ethernet, Controller Area Network (CAN), and/or Local Interconnect Network (LIN) ports. Additionally, one or more of the data ports may be configured for wireless communication, such as using a WiFi or Bluetooth standard, or the like. Although the foregoing provides examples of common data ports that can be implemented on an embedded device 102, it is understood that other wired and/or wireless ports may be used, without departing from the scope of the disclosed technology.

One or more of the data ports may be secured or blocked to prevent connection between various memory devices on the embedded system 102, and an external device. In some embedded device configurations, such as that illustrated in FIG. 1, bootloader memory 106 and application memory 108 may reside on physically (or logically) distinct memories/chips. In other implementations, the bootloader memory and application memory may reside in the same physical memory and/or in the same logical address space on the same physical memory. Additionally, the bootloader memory and application memory may share a common memory address space spanning two or more physical memories that are mapped, for example, to a universal address space. Depending on the desired implementation, bootloader memory 106 and/or application memory 108 may be non-volatile memory devices, such as flash memory devices, or the like.

As discussed above, data ports that provide an interface to the bootloader portion of memory (e.g., data port 112) can be physically obstructed to prevent outside connections. In such instances, it can be difficult to perform bootloader updates by directly updating data stored to the bootloader memory 106. In practice, bootloader memory 106 can be used to store instructions (e.g., binaries) for bootloader firmware that is used to provide boot-up functionality embedded system 102. Application memory 108 can represent a portion of memory that is used to store instructions for one or more applications that can be executed on the embedded system 102, such as by processor 104.

In some deployments, bootloader memory 106 may only be externally accessible via data port 112, thereby making it difficult to update legacy bootloader firmware when data port 112 is physically obstructed, such as is common in AV deployment contexts. To circumvent use of the data port 112, an update application 110 can be used to write new instructions (binaries) e.g., for an updated/target bootloader from the application memory 108 to the bootloader memory 106, e.g., via port 113. In some such approaches, the target bootloader instructions can be stored to one or more data structures that are part of, or reside in/among, the instructions (code) that comprises the update application 100. That is, the update application 110 can be used to store the updated/target bootloader, and to perform steps necessary to copy the target bootloader from data structures within the update application code to the bootloader memory 106. In other aspects, bootloader updates can be performed by using the update application 110 to transfer instructions (updates) from another external device (not illustrated) to the bootloader memory 106. A more detailed overview of an example update application, such as update application 110 is provided with respect to FIG. 2.

Figure 2:
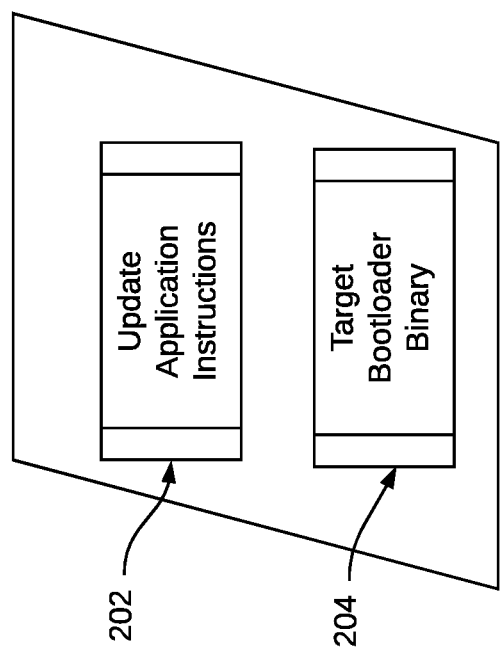
FIG. 2 illustrates a conceptual block diagram of an update application that can be used to facilitate a bootloader update, according to some aspects of the disclosed technology.

FIG. 2 illustrates a conceptual block diagram of an update application 200 that can be used to facilitate a bootloader update. As illustrated in the example of FIG. 2, update application 200 can include at least two data portions, e.g., a first portion that contains update application instructions (202) and at least one additional data structure that includes the updated/target bootloader code/binaries (204). In some aspects, the target bootloader binaries 204 can be embedded within source code for the updated application instructions 202. That is, executable binaries resulting from compiled code of the target bootloader can be stored within source code of update application 202. In this manner, the target bootloader binaries 204 can be ported to a memory of an embedded device, (e.g., application memory 108 of embedded device 102).

Figure 3A:
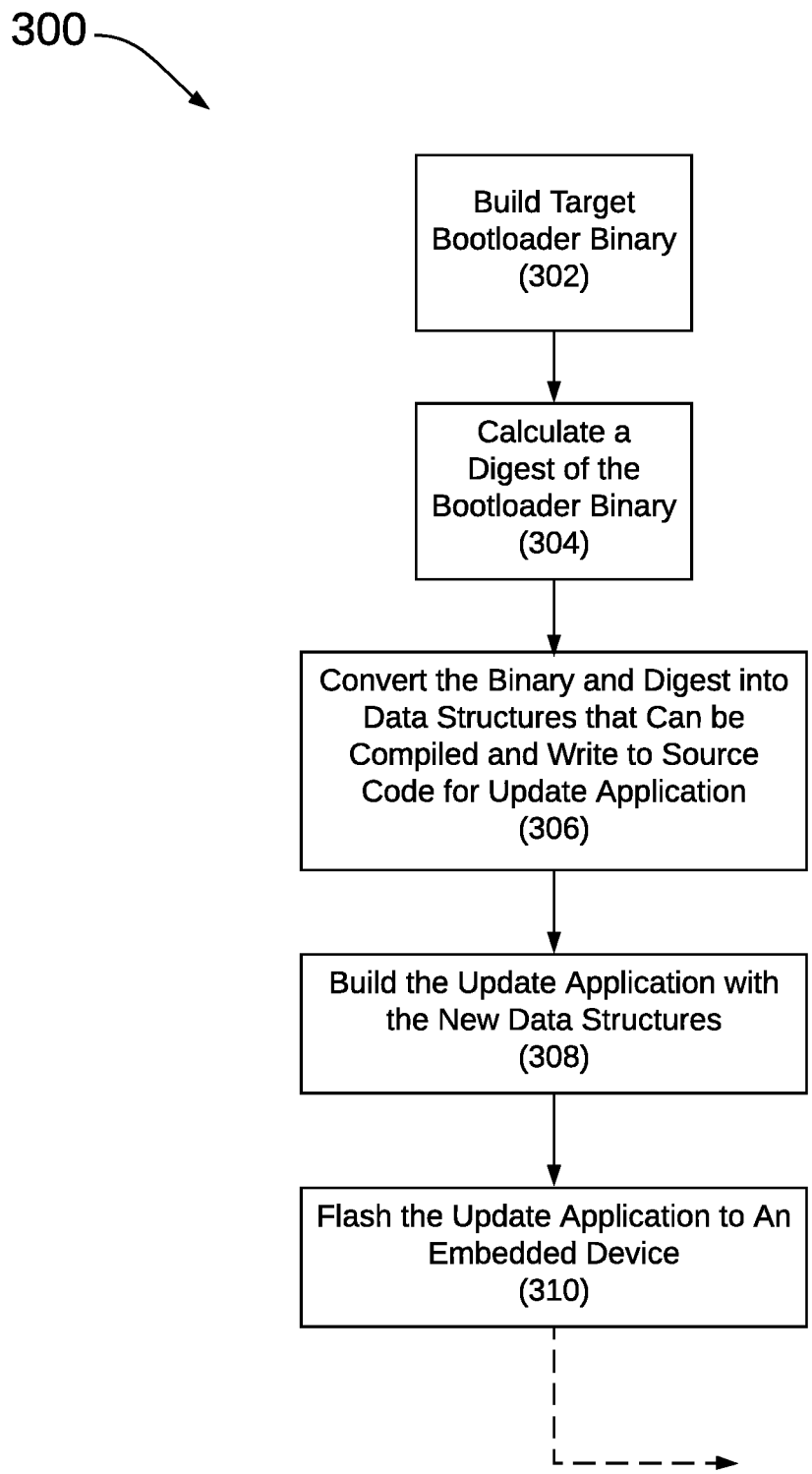
FIGS. 3A and 3B illustrate steps of an example process for performing a bootloader update on an embedded system, according to some aspects of the disclosed technology.
Figure 3B:
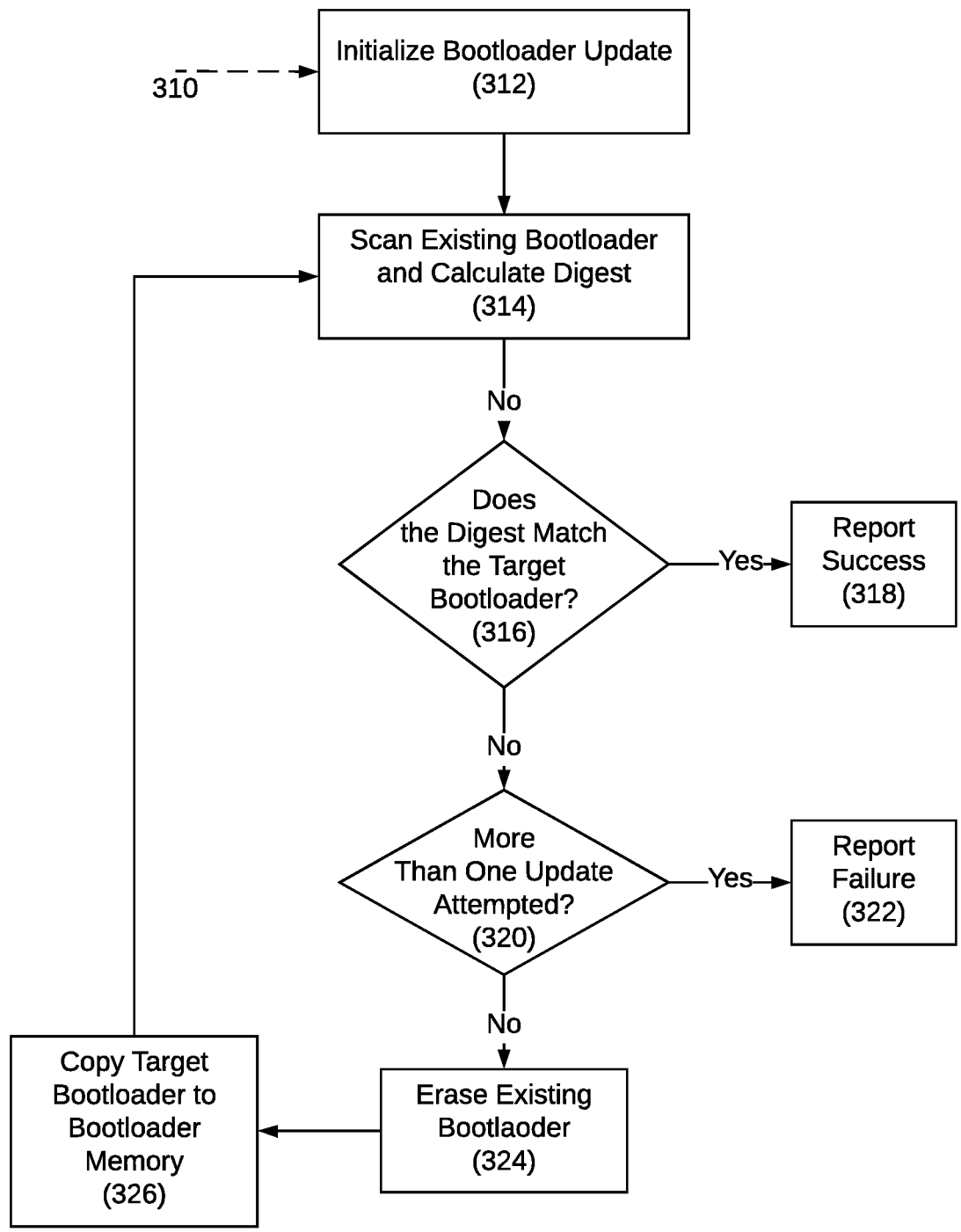

FIGS. 3A and 3B illustrate steps of an example process 300 for performing a bootloader update on an embedded system. Process 300 begins at step 302 in which the binaries of a bootloader update (target bootloader) are built or constructed. The target bootloader binaries can be the result of compiled code for the new bootloader.

At step 304, a digest (hash) of the bootloader binary is computed. The hash can be used to identify versioning information of the bootloader update. For example, digest (hash) of the new (target) bootloader can be different from a digest of an existing (legacy) bootloader, e.g., of a different version. In some implementations, the digest (or hash) may be a SHA-256 hash; however, it is understood that various other hashing algorithms may be used, without departing from the scopes of the disclosed technology. Additionally, various other fingerprinting schemes may be used to identify or determine versioning information for the legacy bootloader, without departing from the scope of the disclosed technology.

Next, the target bootloader binary and digest are converted (stored) into data structures that can be compiled and written to source code of an update application (step 306). Using the converted bootloader and binaries, an update application, containing the new bootloader data structures, can be built (step 308).

In step 310, the update application can be flashed onto the embedded device. In some aspects, the update application can be transferred onto an application (flash) memory portion of the embedded device via dedicated port, such as port 113, discussed above with respect to FIG. 1.

Continuing to FIG. 3B, the process 300 includes step 312, in which an update to the existing (legacy) bootloader is initialized. In some instances, the entire bootloader update process may be handled by instructions in the update application, for example, that are executed by a processor, such as processor 104. Once the update process has been initialized, process 300 proceeds to step 314 in which the existing (legacy) bootloader is scanned and a digest (hash) for the legacy bootloader is determined/calculated. In some aspects, hashing can be used to identify a version of the existing bootloader. In other aspects, versioning information for the existing bootloader may be indicated by a flag or other versioning information that is associated with the bootloader.

At decision step 316, it is determined if the digest for the existing (legacy) bootloader matches the digest of the target bootloader (see step 304). If the bootloader digests match (i.e., they are the same/equal), then it may be determined that a previous update to the target bootloader has been successful (e.g., that the current and target versions are the same), in which case an indication of bootloader update success can be generated (step 318). If the digest of the legacy bootloader does not match that of the target bootloader, then process 300 proceeds to decision step 320, in which it is determined if more than one bootloader update, for the target bootloader version, as been attempted. If it is determined that more than one update for the current version has been attempted, then process 300 proceeds to block 322 in which an update failure indication is generated (step 322). If it is determined that not more than one update has been attempted, then process 300 proceeds to block 324 in which the existing (legacy) bootloader is erased (step 324). Subsequently, the target bootloader can be copied to the bootloader memory to complete the update (step 326), after which, process 300 can revert back to step 314.

Figure 4:
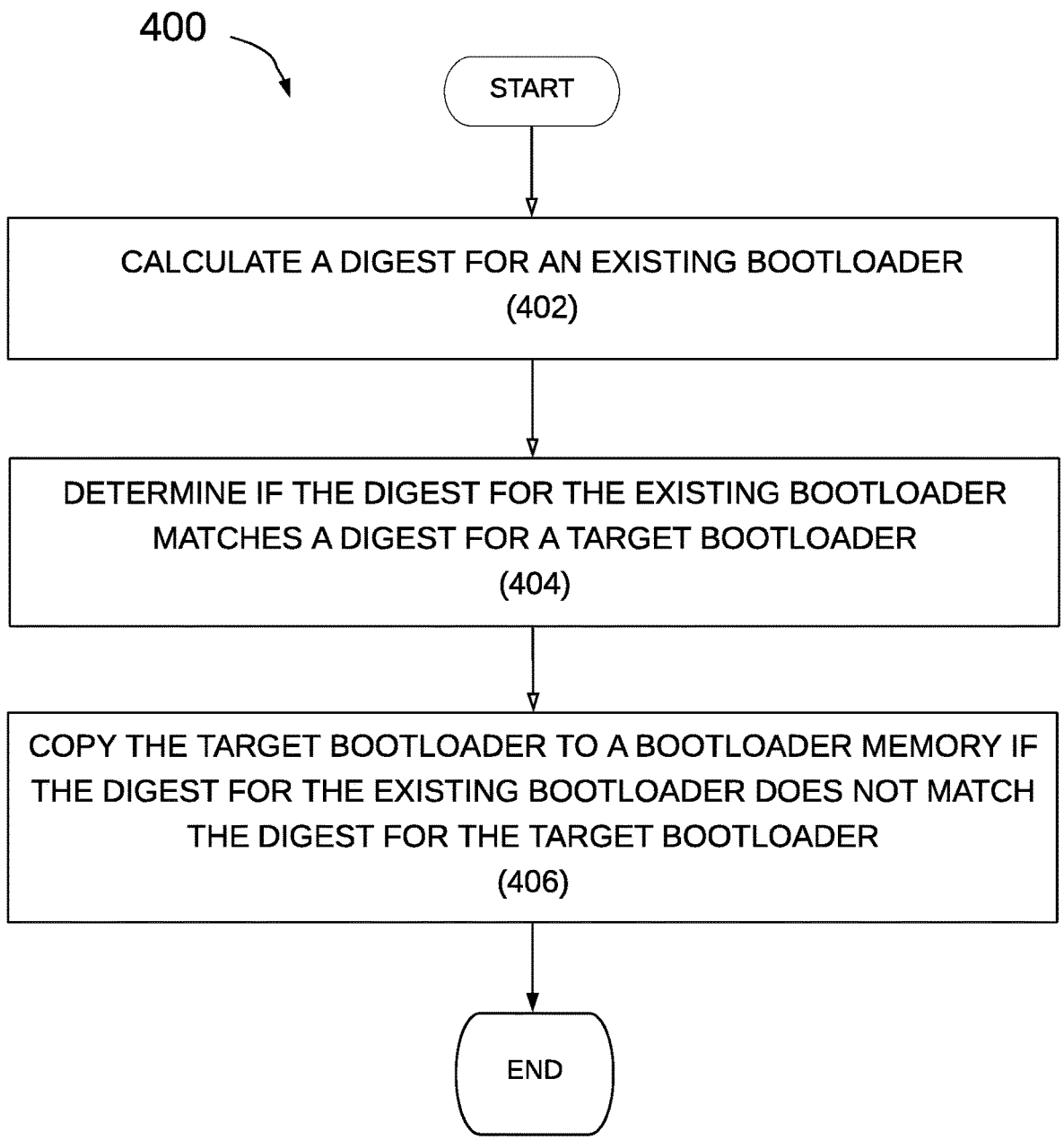
FIG. 4 illustrates steps of an example process for updating a bootloader using an update application, according to some aspects of the disclosed technology.

FIG. 4 illustrates steps of an example process 400 for updating a bootloader using an update application, according to some aspects of the disclosed technology. Step 400 begins with step 402 in which a digest for an existing bootloader is calculated. Depending on the desired implementation, the digest calculation may utilize a hash function, e.g., to determine a hash of all (or part of) the existing bootloader. As discussed above, the digest can provide a unique identifier that indicates versioning information about the existing bootloader.

At step 404, it is determined if the digest for the existing bootloader matches a digest for a target (updated) bootloader. By comparing digests for the existing (legacy) bootloader and the new (updated) bootloader, it can be determined if the two software packages represent different bootloader versions. If the digests match, it may indicate that the bootloader has already been updated to the existing (target) version. If the digests do not match, it can indicate that the existing bootloader should be updated/replaced (step 406), in which case the existing bootloader can be deleted or overwritten, and the target bootloader can be written to its memory space. By way of example, the update process may include the writing of binaries for the target bootloader to a bootloader flash memory space of an embedded device.

Figure 5:
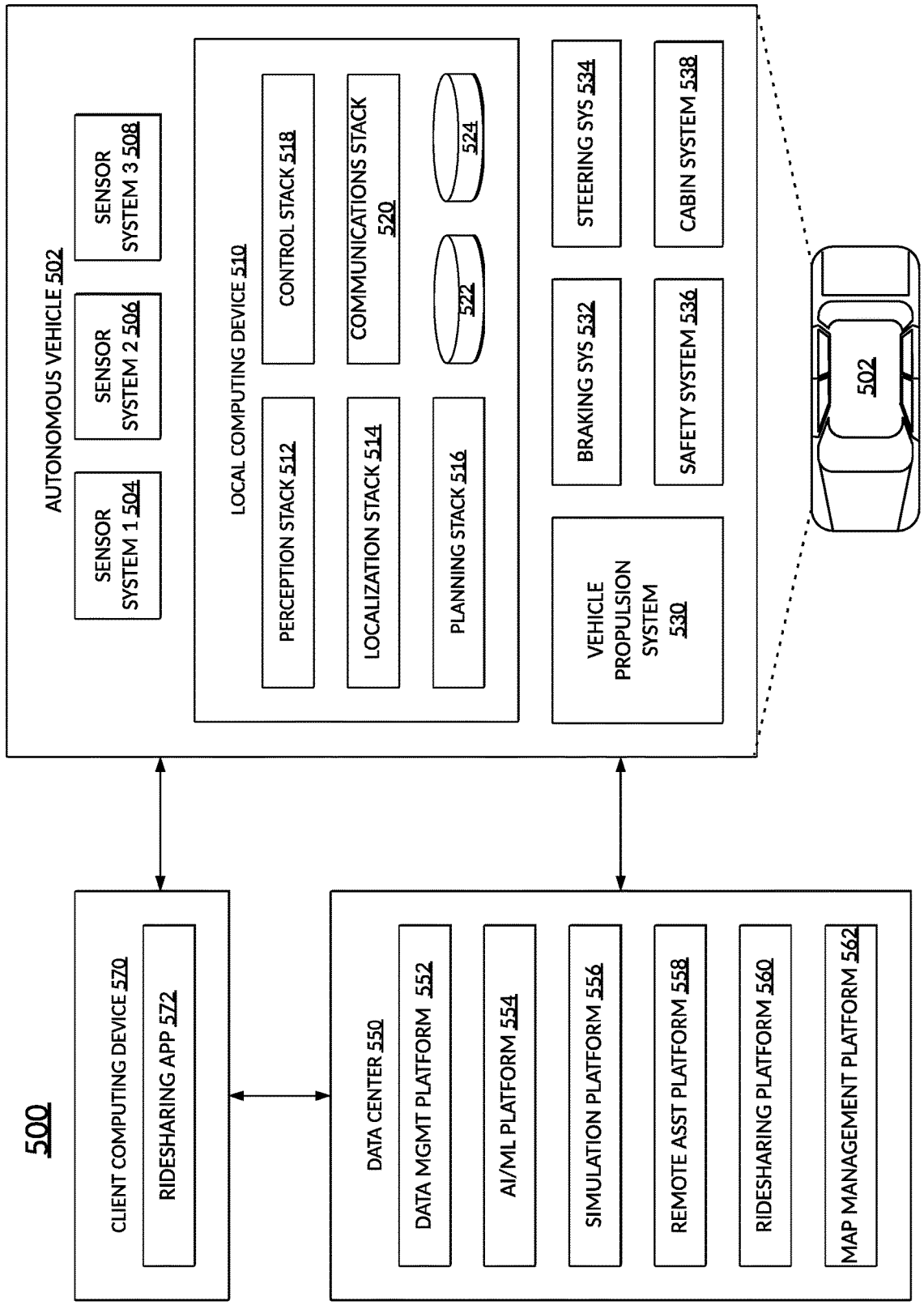
FIG. 5 illustrates an example system environment that can be used to facilitate autonomous vehicle (AV) dispatch and operations, according to some aspects of the disclosed technology.

FIG. 5 illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, brake pads, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, an HD geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth.

Mapping and localization stack 514 can determine the AV's position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image data, RADAR data, GPS data, and other sensor data that the data center 550 can use for creating or updating AV geospatial data.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, a ridesharing platform 560, and map management system platform 562, among other systems.

Data management platform 552 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management system platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management system platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management system platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management system platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, UAVs, satellites, third-party mapping services, and other sources of geospatially referenced data. The raw data can be processed, and map management system platform 562 can render base representations (e.g., tiles (2D), bounding volumes (3D), etc.) of the AV geospatial data to enable users to view, query, label, edit, and otherwise interact with the data. Map management system platform 562 can manage workflows and tasks for operating on the AV geospatial data. Map management system platform 562 can control access to the AV geospatial data, including granting or limiting access to the AV geospatial data based on user-based, role-based, group-based, task-based, and other attribute-based access control mechanisms. Map management system platform 562 can provide version control for the AV geospatial data, such as to track specific changes that (human or machine) map editors have made to the data and to revert changes when necessary. Map management system platform 562 can administer release management of the AV geospatial data, including distributing suitable iterations of the data to different users, computing devices, AVs, and other consumers of HD maps. Map management system platform 562 can provide analytics regarding the AV geospatial data and related data, such as to generate insights relating to the throughput and quality of mapping tasks.

In some embodiments, the map viewing services of map management system platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
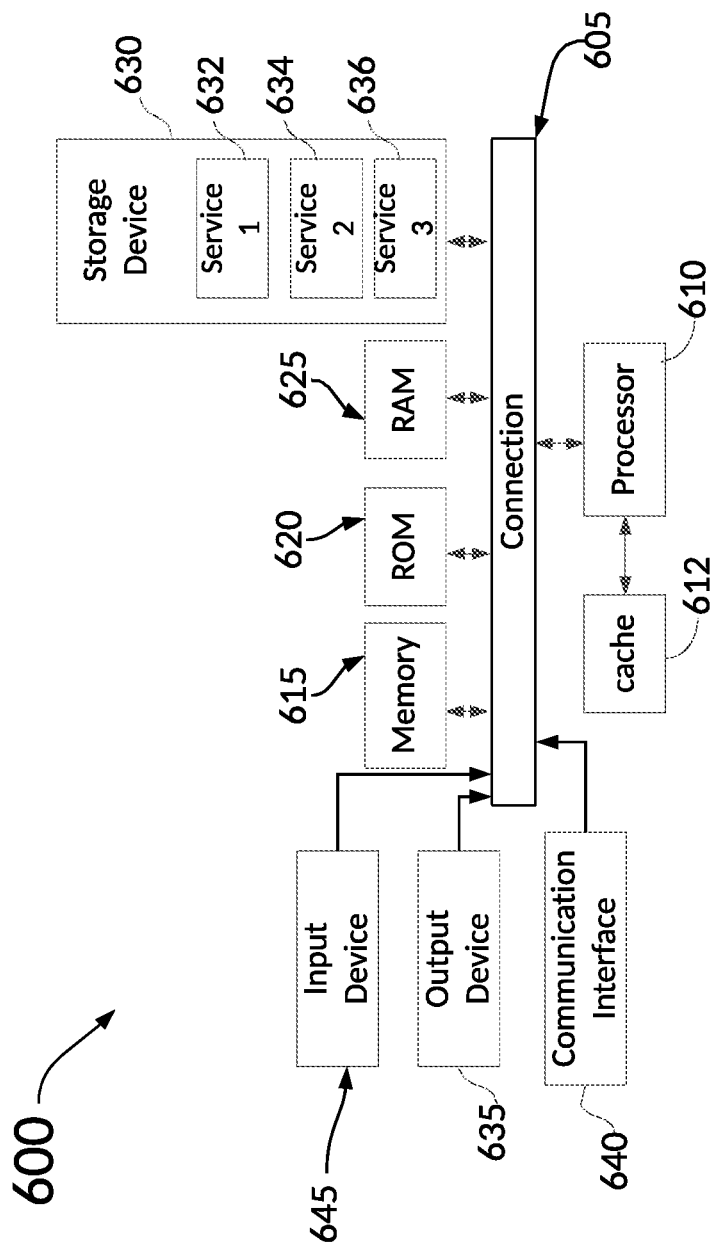
FIG. 6 illustrates an example processor-based system with which some aspects of the subject technology can be implemented.

FIG. 6 illustrates an example processor-based system with which some aspects of the subject technology can be implemented. Specifically, FIG. 6 illustrates system architecture 600 wherein the components of the system are in electrical communication with each other using a bus 605. System architecture 600 can include a processing unit (CPU or processor) 610, as well as a cache 612, that are variously coupled to system bus 605. Bus 605 connects various system components including a non-transitory computer-readable storage medium 615, (e.g., read only memory (ROM) 620 and random-access memory (RAM) 625, to processor 610.

System architecture 600 can include a cache of high-speed memory connected directly with, in close proximity to, or integrated as part of the processor 610. System architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. Memory 615 can include multiple different types of memory with different performance characteristics. Processor 610 can include any general purpose processor and a hardware module or software module, such as module 1 (632), module 2 (634), and module 3 (636) stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms. In some instances, multimodal systems can enable a user to provide multiple types of input to communicate with the computing system architecture 600. Communications interface 640 can generally govern and manage the user input and system output. There is no restriction on operating on any particular hardware arrangement and therefore the basic features here may easily be substituted for improved hardware or firmware arrangements as they are developed.

Environmental sensors 650 can include various sensors that are configured to make measurements/detect the surrounding environs and provide corresponding signaling to processor 610. Although environmental sensors 650 man include sensors of virtually any type, in some implementations environmental sensors 650 can include one or more cameras, depth cameras, LiDARs, and/or sonars, etc.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include software modules 632, 634, 636, for controlling processor 610. Other hardware or software modules are contemplated. Storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out various functions of the disclosed technology.

By way of example, instruction stored on computer-readable media can be configured to cause one or more processors to perform operations including: navigating an autonomous vehicle (AV) along a route terminating in a drop-off location specified by a rider of the AV; detecting an arrival of the AV at the drop-off location; sending location information of the AV to a mobile device associated with the rider; and initializing augment reality (AR) guidance for the rider on the mobile device, wherein the AR guidance is configured to provide the rider with navigation information pertaining to the drop-off location.

By way of further example, instructions stored on computer-readable media can be configured to cause one or more processors to perform operations including: transmitting an autonomous vehicle (AV) ride request from a mobile device to an AV dispatch service, wherein the ride request comprises location information of the mobile device; receiving, at the mobile device, a ride confirmation indicating that an AV has been dispatched to a rider associated with the mobile device; detecting arrival of the AV at a pick-up location associated with the rider; and initializing augment reality (AR) guidance on the mobile device, wherein the AR guidance is configured to provide the rider with navigation information to facilitate pick-up by the AV.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An embedded device, comprising:
    a bootloader memory;
    an application memory; and
    at least one processor coupled to the bootloader memory and the application memory, the at least one processor configured to:
    execute an update application stored on the application memory, wherein the update application is configured to perform operations for:
        calculating a digest for an existing bootloader stored on the bootloader memory;
        determining if the digest for the existing bootloader matches a digest for a target bootloader, wherein the target bootloader is stored on a data structure contained within an instruction set of the update application in the application memory; and
        if the digest for the existing bootloader does not match the digest for the target bootloader, copying the target bootloader to the bootloader memory.

2. The embedded device of claim 1, wherein the update application is further configured to perform operations for:
    generating a report to indicate a successful bootloader update, if the digest for the existing bootloader matches a digest for the target bootloader.

3. The embedded device of claim 1, wherein copying the target bootloader to the bootloader memory causes a rewrite of the existing bootloader.

4. The embedded device of claim 1, wherein at least one of the bootloader memory and the application memory is a non-volatile memory device.

5. The embedded device of claim 1, wherein the bootloader memory and the application memory share a common memory address space.

6. The embedded device of claim 1, further comprising:
    a data interface communicatively coupled to one or more of: the application memory or the bootloader memory.

7. The embedded device of claim 6, wherein the data interface comprises a Serial Wire Debut (SWD) port.

8. The embedded device of claim 6, wherein the data interface comprises a Joint Test Action Group tap port.

9. A computer-implemented method, comprising:
    calculating a digest for an existing bootloader stored on a bootloader memory of an embedded device;
    determining if the digest for the existing bootloader matches a digest for a target bootloader, wherein the target bootloader is stored on a data structure contained within an instruction set of an update application in an application memory of the embedded device; and
    if the digest for the existing bootloader does not match the digest for the target bootloader, copying the target bootloader to the bootloader memory.

10. The computer-implemented method of claim 9, further comprising:
    generating a report to indicate a successful bootloader update, if the digest for the existing bootloader matches a digest for the target bootloader.

11. The computer-implemented method of claim 9, wherein copying the target bootloader to the bootloader memory causes a rewrite of the existing bootloader.

12. The computer-implemented method of claim 9, wherein at least one of the bootloader memory and the application memory is a non-volatile memory device.

13. The computer-implemented method of claim 9, wherein the bootloader memory and the application memory share a common memory address space.

14. The computer-implemented method of claim 9, wherein a data interface is communicatively coupled to one or more of: the application memory or the bootloader memory.

15. A non-transitory computer-readable storage medium comprising at least one instruction for causing a computer or processor to perform operations comprising:
    calculating a digest for an existing bootloader stored on a bootloader memory of an embedded device;
    determining if the digest for the existing bootloader matches a digest for a target bootloader, wherein the target bootloader is stored on a data structure contained within an instruction set of an update application in an application memory of the embedded device; and
    if the digest for the existing bootloader does not match the digest for the target bootloader, copying the target bootloader to the bootloader memory.

16. The non-transitory computer-readable storage medium of claim 15, wherein the least one instruction is further configured to cause a computer or processor to perform operations comprising:
    generating a report to indicate a successful bootloader update, if the digest for the existing bootloader matches a digest for the target bootloader.

17. The non-transitory computer-readable storage medium of claim 15, wherein copying the target bootloader to the bootloader memory causes a rewrite of the existing bootloader.

18. The non-transitory computer-readable storage medium of claim 15, wherein at least one of the bootloader memory and the application memory is a non-volatile memory device.

19. The non-transitory computer-readable storage medium of claim 15, wherein the bootloader memory and the application memory share a common memory address space.

20. The non-transitory computer-readable storage medium of claim 15, wherein a data interface is communicatively coupled to one or more of: the application memory or the bootloader memory.

* * * * *